US007167278B2

(12) United States Patent
Yamada et al.

(10) Patent No.: US 7,167,278 B2
(45) Date of Patent: Jan. 23, 2007

(54) IMAGE PROCESSING APPARATUS, IMAGE PROCESSING METHOD, PROGRAM FOR IMPLEMENTING THE METHOD

(75) Inventors: Akitoshi Yamada, Kanagawa (JP); Masao Kato, Kanagawa (JP)

(73) Assignee: Canon Kabushiki Kaisha (JP)

( * ) Notice: Subject to any disclaimer, the term of this patent is extended or adjusted under 35 U.S.C. 154(b) by 564 days.

(21) Appl. No.: 10/390,878

(22) Filed: Mar. 17, 2003

(65) Prior Publication Data

US 2003/0214676 A1    Nov. 20, 2003

(30) Foreign Application Priority Data

Mar. 15, 2002   (JP)   ............... 2002-072148

(51) Int. Cl.
*H04N 1/405*   (2006.01)
*H04N 1/52*    (2006.01)

(52) U.S. Cl. .................. 358/3.05; 358/534; 347/15

(58) Field of Classification Search ................. 358/1.9, 358/3.03, 3.04, 3.05, 534–536, 252; 382/162; 347/15
See application file for complete search history.

(56) References Cited

U.S. PATENT DOCUMENTS

| 5,565,994 | A | * | 10/1996 | Eschbach | ............... | 358/3.03 |
| 5,739,917 | A | * | 4/1998 | Shu et al. | ............... | 358/3.06 |
| 5,838,885 | A | * | 11/1998 | Shu et al. | ............... | 358/1.9 |
| 2002/0097456 | A1 | * | 7/2002 | Yamada et al. | ............ | 358/3.06 |
| 2003/0174352 | A1 | * | 9/2003 | Yamada et al. | ............ | 358/1.9 |
| 2004/0051905 | A1 | * | 3/2004 | Yamada et al. | ............ | 358/3.03 |
| 2004/0196478 | A1 | * | 10/2004 | Imafuku et al. | ............ | 358/1.9 |

FOREIGN PATENT DOCUMENTS

| JP | 54-56847 | 5/1979 |
| JP | 59-123670 | 7/1984 |
| JP | 59-138461 | 8/1984 |
| JP | 60-71260 | 4/1985 |
| JP | 8-279920 | 10/1996 |
| JP | 9-139841 | 5/1997 |
| JP | 11-10918 | 1/1999 |

* cited by examiner

*Primary Examiner*—Scott A. Rogers
(74) *Attorney, Agent, or Firm*—Rossi, Kimms & McDowell LLP

(57) ABSTRACT

There is provided an image processing apparatus that can reduce the overlap of dots to thereby enable achievement of favorable visual characteristics, and reduce the amount of pseudo outlines in half tone and reduce the quantity of inks to be shot to thereby suppress an increase in the running cost. When performing the error diffusion on a first density component of the plurality of density components, a threshold to be used for the error diffusion is determined based on a density value of at least one second density component of the plurality of density components. The error diffusion on the first density component is executed based on the determined threshold. A result of the executed error diffusion is outputted.

24 Claims, 7 Drawing Sheets

IMAGE PROCESSING APPARATUS, IMAGE PROCESSING METHOD, PROGRAM FOR IMPLEMENTING THE METHOD

BACKGROUND OF THE INVENTION

1. Field of the Invention

The present invention relates to an image processing apparatus and an image processing method that perform error diffusion as pseudo-halftoning process on multivalued image data, and a program for implementing the image processing method.

2. Description of the Related Art

Conventionally, an error diffusing process has been known as a pseudo-halftoning process in which multivalued images are expressed as binary data ("An Adaptive Algorithm for Spatial Gray Scale" in society for Information Display 1975 Symposium Digest of Technical Papers, 1975, 36). In this process, where a notice pixel is designated by P, the density thereof is designated by v, the densities of peripheral pixels P0, P1, P2, and P3 around the notice pixel P are designated by v0, v1, v2, and v3, respectively, and a binarization threshold is designated by T, a binarization error E of the notice pixel P is distributed to the peripheral pixels P0, P1, P2, and P3 by respective weighting factors W0, W1, W2, and W3 obtained empirically so that the average density can be macroscopically equal to the density of the original image.

For example, where binary data to be outputted is designated by o, the output binary data, binarization error E, the respective densities v0, v1, v2, and v3 of the peripheral pixels P1, P1, P2, and P3 are expressed by:

$$\text{if } v \geq T, o=1 \text{ and } E=v-V_{max}$$

$$\text{if } v<T, o=0 \text{ and } E=v-V_{min} \qquad (1)$$

(Vmax: maximum density, Vmin: minimum density)

$$v0=v0+E \times W0 \qquad (2)$$

$$v1=v1+E \times W1 \qquad (3)$$

$$v2=v2+E \times W2 \qquad (4)$$

$$v3=v3+E \times W3 \qquad (5)$$

(Examples of the weighting factors: $W0=7/16$, $W1=1/16$, $W2=5/16$, and $W3=3/16$)

To output a multivalued image using inks of four colors consisting of cyan (C), magenta (M), yellow (Y), and black (K), a color ink-jet printer or the like has conventionally carried out a pseudo-halftoning process in which error diffusion or the like is performed for individual colors independently of each other. Thus, even if visual characteristics are excellent in terms of a single color, favorable visual characteristics cannot be necessarily achieved in the case where two or more colors are overlapped.

To address this problem, Japanese Laid-Open Patent Publication (Kokai) No. 8-279920 and Japanese Laid-Open Patent Publication (Kokai) No. 11-10918, for example, have disclosed a pseudo-halftoning process in which error diffusion is performed on two or more colors to achieve favorable visual characteristics even if two or more colors are overlapped.

Japanese Laid-Open Patent Publication (Kokai) No. 09-139841 has also disclosed a process in which pseudo-halftoning is performed individually for two or more colors, and output values based on the sum of input values are then corrected to obtain the same effects as described above.

Particularly, to reduce the graininess of intermediate density regions of a color image, it is effective to form an image such that dots of the cyan component (C) and dots of the magenta component (M) are not overlapped. To this end, the following method has been employed.

Figure 7:
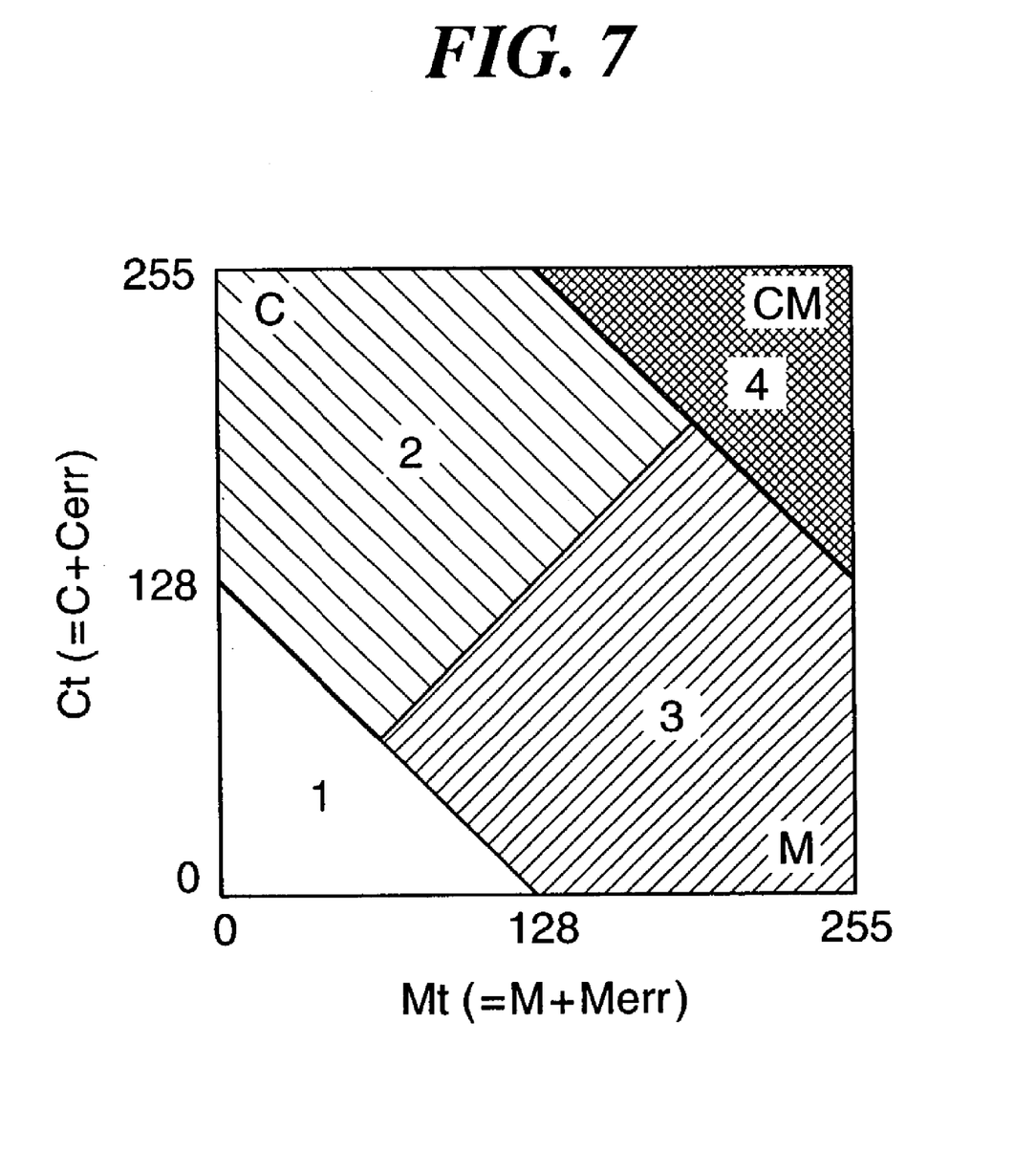
FIG. 7 is a view useful in explaining a conventional color image processing method.

FIG. 7 is a view useful in explaining a conventional color image processing method.

In FIG. 7, the image data of a color image is expressed as multivalued data in which coloring density components (YMCK) of each pixel are each composed of 8 bits (gradation values of 0 to 255). Where the density values of the C component and the M component of a notice pixel in a multivalued color image are designated by Ct and Mt, respectively, and the density values of the C component and the M component of the original image are designated by C and M, respectively, the density values Ct and Mt are expressed by:

$$Ct=C+Cerr$$

$$Mt=M+Merr$$

Here, Cerr and Merr represent accumulated error values obtained by error diffusion of the C component and M component, respectively, of the notice pixel.

According to the conventional color image processing method, control is provided in four ways according to the density values of the C component and the M component of a notice pixel as described below.

1. If the sum of Ct and Mt is equal to or less than a threshold (Threshold 1), i.e. if the sum of Ct and Mt lies inside a region 1 of FIG. 7, dot-recording using C (cyan) ink and M (magenta) ink is not performed.

2. If the sum of Ct and Mt is greater than the threshold (Threshold 1) and less than another threshold (Threshold 2) and Ct is greater than Mt, i.e. if the sum of Ct and Mt lies inside a region 2 of FIG. 7, dot-recording using only C ink is performed.

3. If the sum of Ct and Mt is greater than the threshold (Threshold 1) and less than the other threshold (Threshold 2) and Ct is equal to or less than Mt, i.e. if the sum of Ct and Mt lies inside a region 3 of FIG. 7, dot-recording using only M ink is performed.

4. If the sum of Ct and Mt is equal to or greater than the other threshold (Threshold 2), i.e. if the sum of Ct and Mt lies inside a region 4 of FIG. 7, dot-recording using C ink and M ink is performed.

It should be noted that the relationship between the above-mentioned two thresholds is expressed by Threshold 1<Threshold 2.

However, the above described conventional image processing method is intended to reduce the overlap of ink dots of different colors such as cyan and magenta, but cannot eliminate factors that can deteriorate other visual characteristics as described below.

1. The overlap of dark ink dots and light ink dots of the same color system with different coloring densities.

2. The overlap of large droplet ink dots and small droplet ink dots of the same color system with different discharge rates.

3. The overlap of dots of the entire ink system including an ink group consisting of the inks in the above 1. and 2. and a plurality of color inks in the prior art.

Particularly, the overlap of the inks in the above 1. and 2. deteriorates visual characteristics due to the overlap of dots, generates a pseudo outline in half-tone, and increases the quantity of inks shot for reduction of the pseudo outline, thus raising the running cost.

SUMMARY OF THE INVENTION

It is therefore an object of the present invention to provide an image processing apparatus and an image processing method that can reduce the overlap of dots to thereby enable achievement of favorable visual characteristics, and reduce the amount of pseudo outlines in half tone and reduce the quantity of inks to be shot to thereby suppress an increase in the running cost, as well as a program for implementing the image processing method.

To attain the above object, in a first aspect of the present invention, there is provided an image processing apparatus comprising a determination device operable when performing the error diffusion on a first density component of the plurality of density components, for determining a threshold to be used for the error diffusion based on a density value of at least one second density component of the plurality of density components, an executing device that executes the error diffusion on the first density component based on the determined threshold, and an output device that outputs a result of the executed error diffusion.

To attain the above object, in a second aspect of the present invention, there is provided an image processing apparatus comprising a determination device operable when performing the error diffusion on a first density component of the plurality of density components, for determining a threshold to be used for the error diffusion based on density values of at least two second density components of the plurality of density components, an executing device that executes the error diffusion on the first density component based on the determined threshold, and an output device that outputs a result of the executed error diffusion.

To attain the above object, in a third aspect of the present invention, there is provided an image processing apparatus comprising a determination device operable when performing the error diffusion on a first density component of the plurality of density components, for determining a threshold to be used for the error diffusion based on at least one of a sum of and a maximum value of density values of at least two second density components of the plurality of density components, an executing device that executes the error diffusion on the first density component based on the determined threshold, and an output device that outputs a result of the executed error diffusion.

To attain the above object, in a fourth aspect of the present invention, there is provided an image processing method comprising a determination step of determining a threshold to be used for the error diffusion based on a density value of at least one second density component of the plurality of density components when performing the error diffusion on a first density component of the plurality of density components, an executing step of executing the error diffusion on the first density component based on the determined threshold, and an output step of outputting a result of the executed error diffusion.

To attain the above object, in a fifth aspect of the present invention, there is provided an image processing method comprising a determination step of determining a threshold to be used for the error diffusion based on density values of at least two second density components of the plurality of density components when performing the error diffusion on a first density component of the plurality of density components, an executing step of executing the error diffusion on the first density component based on the determined threshold, and an output step of outputting a result of the executed error diffusion.

To attain the above object, in a sixth aspect of the present invention, there is provided an image processing method comprising a determination step of determining a threshold to be used for the error diffusion based on at least one of a sum of and a maximum value of density values of at least two second density components of the plurality of density components when performing the error diffusion on a first density component of the plurality of density components, an executing step of executing the error diffusion on the first density component based on the determined threshold, and an output device of outputting a result of the executed error diffusion.

To attain the above object, in a seventh aspect of the present invention, there is provided a program comprising a determination module operable when performing the error diffusion on a first density component of the plurality of density components, for determining a threshold to be used for the error diffusion based on a density value of at least one second density component of the plurality of density components, an executing module for executing the error diffusion on the first density component based on the determined threshold, and an output module for outputting a result of the executed error diffusion.

To attain the above object, in an eighth aspect of the present invention, there is provided a program comprising a determination module operable when performing the error diffusion on a first density component of the plurality of density components, for determining a threshold to be used for the error diffusion based on density values of at least two second density components of the plurality of density components, an executing module for executing the error diffusion on the first density component based on the determined threshold, and an output module for outputting a result of the executed error diffusion.

To attain the above object, in a ninth aspect of the present invention, there is provided a program comprising a determination module operable when performing the error diffusion on a first density component of the plurality of density components, for determining a threshold to be used for the error diffusion based on at least one of a sum of and a maximum value of density values of at least two second density components of the plurality of density components, an executing module for executing the error diffusion on the first density component based on the determined threshold, and an output module for outputting a result of the executed error diffusion.

The above and other objects, features, and advantages of the invention will become more apparent from the following detailed description taken in conjunction with the accompanying drawings.

DETAILED DESCRIPTION OF THE PREFERRED EMBODIMENTS

The present invention will now be described in detail with reference to the drawings showing preferred embodiments thereof.

Figure 1:
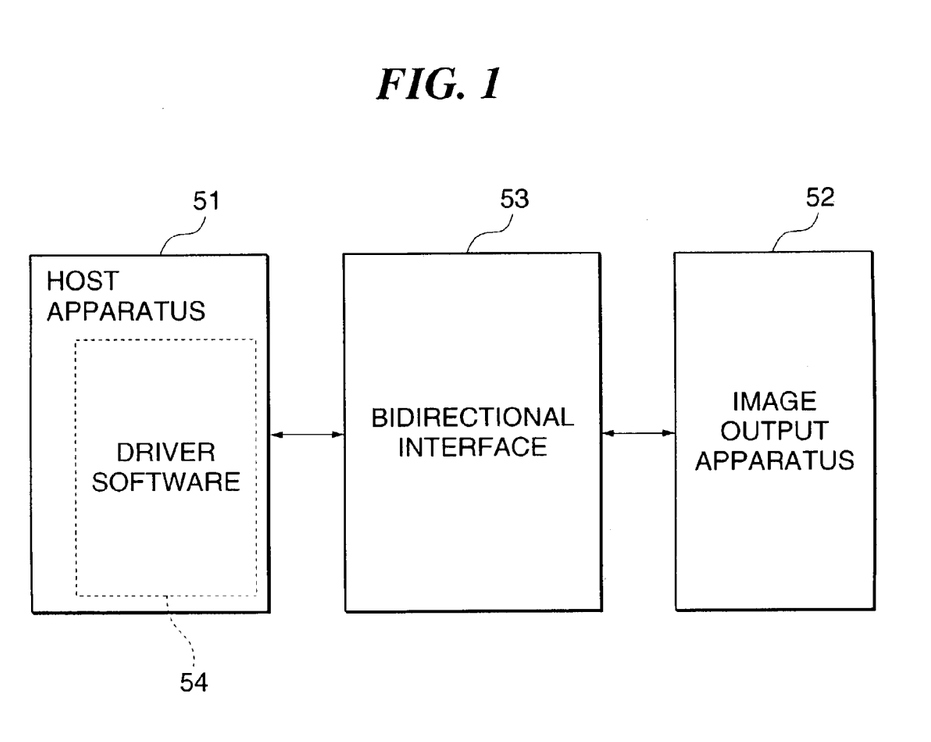
FIG. 1 is a schematic block diagram showing the construction of an information processing system to which is applied an image processing apparatus according to a first embodiment of the present invention.

FIG. 1 is a schematic block diagram showing the construction of an information processing system to which is applied an image processing apparatus according to a first embodiment of the present invention.

Referring to FIG. 1, the information processing system according to the present embodiment is comprised of a host apparatus 51 such as a personal computer or the like, and image output apparatuses 52 such as ink-jet printers to record characters, images, and so forth on recording media such as sheets. The host apparatus 51 and the image output apparatuses 52 are connected to each other via a bidirectional interface 53.

The host apparatus 51 is a host computer including an MPU, a memory, a hard disk drive as a mass storage device, a keyboard, and a display device comprised of a CRT or the like, described later. The memory of the host apparatus 51 has driver software 54 loaded therein.

Figure 2:
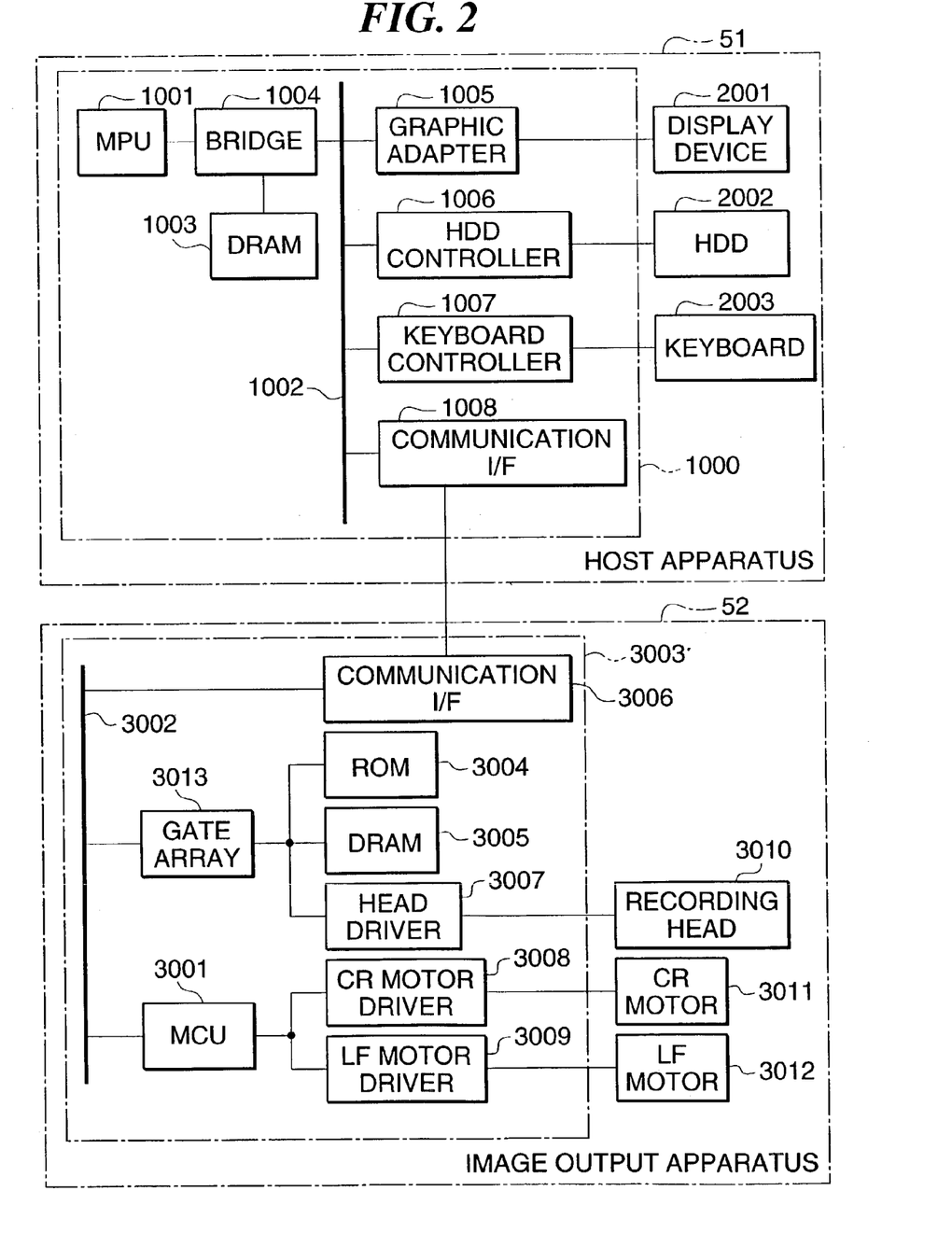
FIG. 2 is a schematic block diagram showing the hardware configuration of a host apparatus 51 and an image output apparatus 52 in FIG. 1.

FIG. 2 is a schematic block diagram showing the hardware configuration of the host apparatus 51 and the image output apparatuses 52 in FIG. 1.

As shown in FIG. 2, the host apparatus 51 is comprised of a processing section 1000, a display device 2001, a hard disk drive (HDD) 2002 that stores control programs and data, and a keyboard 2003.

The processing section 1000 performs image processing and error diffusion described later, and is comprised of an MPU 1001 that controls the overall operation of the host apparatus 51 according to control programs; a system bus 1002 that connects component parts of the processing section 1000 to each other; a DRAM (Dynamic RAM) 1003 that temporarily stores control programs, data, and so forth to be executed by the MPU 1001 in image processing, error diffusion, and the like; a bridge 1004 for connecting the MPU 1001 and the DRAM 1003 to the system bus 1002; and a graphic adapter 1005 having a function of providing control to display graphic information on the display device 2001.

The processing section 1000 is further comprised of an HDD controller that provides interface for connecting with the HDD 2002, a keyboard controller 1007 that provides interface for connecting with the keyboard 2003, and a communication I/F 1008 as a parallel interface that controls communication between the host apparatus 51 and the image output apparatus 52 according to the IEEE standard 1284.

The processing section 1000 is connected to the display device 2001 via the graphic adapter 1005, is connected to the HDD 2002 via the HDD controller 1006, and is connected to the keyboard 2003 via the keyboard controller 1007.

The image output apparatus 52 is comprised of a control circuit section 3003, a recording head 3010, a CR (Carriage Return) motor 3011 that drives a carrier which carries the recording head 3010, and an LF (Line Feed) motor 3012 that conveys sheets.

The control circuit section 3003 has a control program executing function and a peripheral device control function, and is comprised of an MCU 3001 that controls the overall operation of the image output apparatus 52, a system bus 3002 that connects component parts of the control circuit section 3003 to each other, and a gate array 13 that has incorporated therein a control circuit for supplying image data to the recording head 3010, a control circuit for decoding memory addresses, and a control circuit for generating control pulses to the CR motor 3011.

The control circuit 3003 is further comprised of a ROM 3004 that stores control programs to be executed by the MCU 3001, host printing information, and so forth; a DRAM 3005 that stores a variety of data (e.g. image recording information and image data to be supplied to the recording head 3010); a communication I/F 3006 as a parallel interface that provides interface for communication between the host apparatus 51 and the image output apparatus 52 according to the IEEE standard 1284; and a head driver 3007 that converts a recording signal outputted from the gate array 3013 into an electric signal for driving the recording head 3010.

The control circuit section 3003 is comprised of a CR motor driver 3008 that converts a CR motor control pulse signal outputted from the gate array 3013 into an electric signal for actually driving the CR motor 3011, and an LF motor driver 3009 that converts a conveying motor control pulse signal outputted from the MCU 3001 into an electric signal for actually driving the LF motor 3012.

A description will now be given of the specific construction of the image output apparatus 52.

Figure 3:
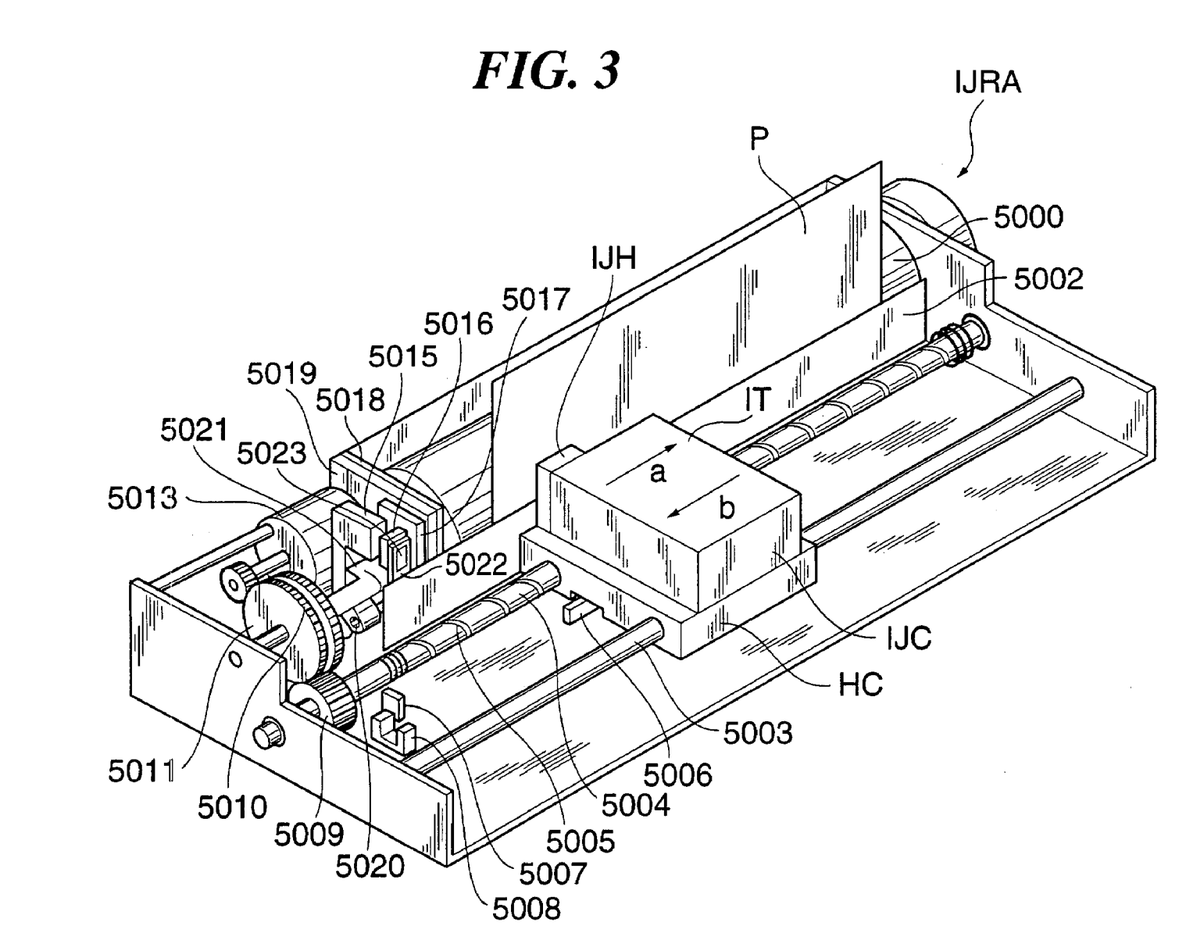
FIG. 3 is a perspective view showing an ink-jet printer which is a typical embodiment of the image output apparatus 52 in FIG. 1.

FIG. 3 is a schematic perspective view showing the construction of an ink-jet printer, which is a typical embodiment of the image output apparatus 52 in FIG. 1.

Referring to FIG. 3, an ink-jet printer IJRA is comprised of a recording head IJH (corresponding to the recording head 3010 in FIG. 2), a carriage HC, an ink tank IT, and an ink cartridge IJC, as well as the control circuit section 3003 shown in FIG. 2.

The recording head IJH is capable of recording color images on a sheet P using inks of at least four colors consisting of yellow (Y), magenta (M), cyan (C), and black (K) based on multivalued density data of Y, M, C, and K components.

The carriage HC is engaged with a spiral groove 5004 of a lead screw 5005, which rotates in response to forward and backward rotation of a driving motor 5013 via driving force transmission gears 5009 to 5011. The carriage HC is comprised of pins, not shown, and is moved back and forth in directions indicated by the arrows a and b in FIG. 3.

The carriage HC carries an integral type ink-jet cartridge IJC that has the recording head IJH and the ink tank IT incorporated therein. A sheet pressing plate 5002 presses the sheet P against a platen 5000 over the moving span of the carriage HC. Photo-couplers 5007 and 5008 are home position sensors that detect the presence or absence of a lever 5006 of the carriage HC to switch the rotational direction of the driving motor 5013.

A support member 5016 is used to support a cap member 5022 that caps a front surface of the recording head IJH. A sucking device 5015 sucks the cap member 5022 and performs suction restoration on the recording head IJH through an in-cap opening 5023. A member 5019 enables a cleaning blade 5017 to move back and forth, and the member 5019 and the cleaning blade 5017 are supported on a main body support plate 5018. It should be noted that the cleaning blade 5017 is not restricted to the one according to the present embodiment, but a known cleaning blade may be applied as the cleaning blade 5017.

A lever 5021 is used to start the sucking action for the suction restoration, and moves with the movement of a cam 5020 engaged with the carriage HC. The movement of the lever 5021 is controlled by a driving force, which is transmitted from the driving motor 5013 to the cam 5020 via a known transmission mechanism such as a clutch.

Although the image output apparatus 52 is constructed such that the above described capping, cleaning, and suction restoration can be performed as desired at the respective corresponding positions due to the operation of the lead screw 5005 when the carriage HC enters a region on the home position side, the present invention is not limited to this insofar as desired operation can be performed as desired in known timing.

Incidentally, although the ink-jet cartridge IJC is comprised of the ink tank IT and the recording head IJH integrated with each other, i.e. formed in one body, as mentioned above such that it may be replaced as a unit with a new ink-jet cartridge IJC, the present invention is not limited to this, but the ink-jet cartridge IJC may be constructed such that the ink tank IT and the recording head IJH are capable of being separated from each other so that only the ink tank IT can be replaced upon ink exhaustion.

Figure 4:
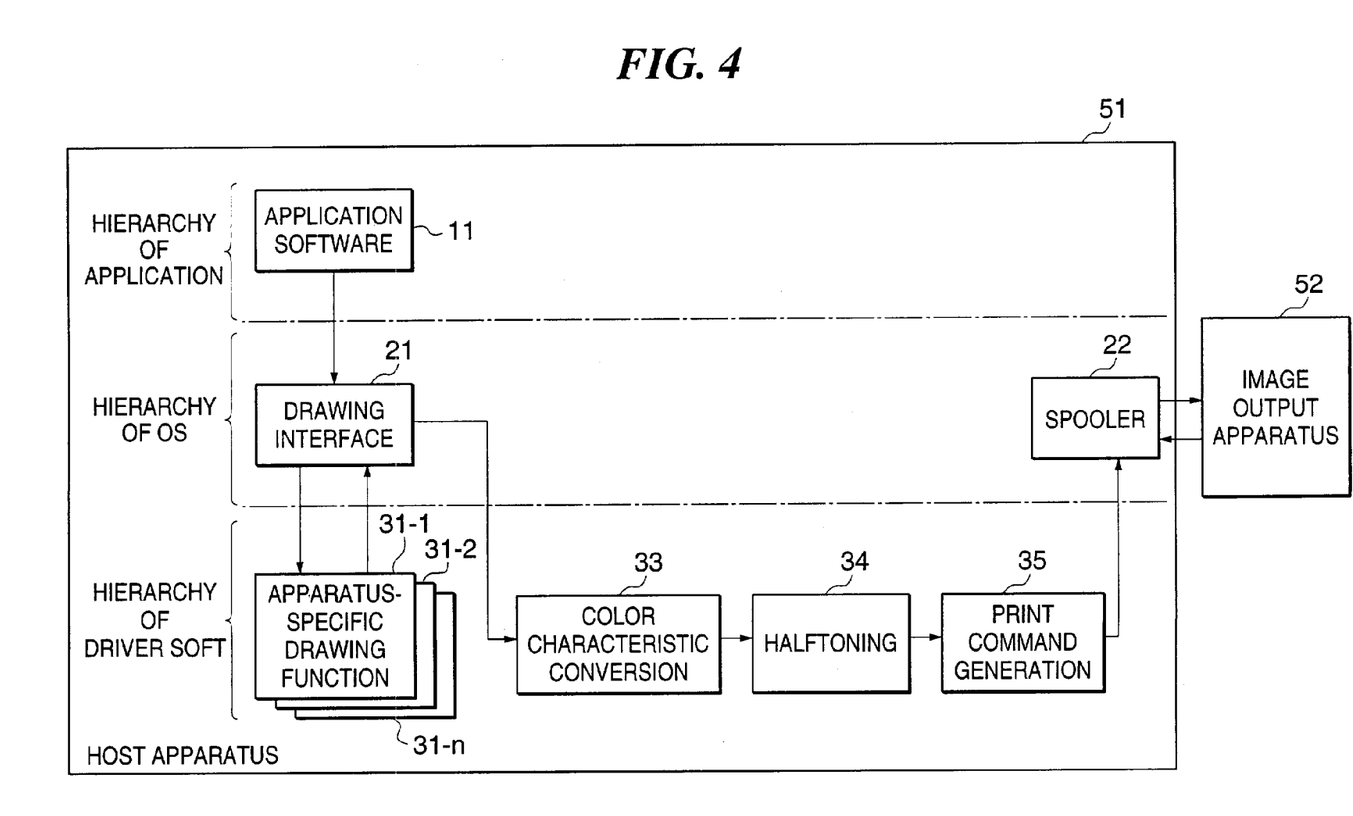
FIG. 4 is a block diagram showing the configuration of software employed in the information processing system in FIG. 1.

FIG. 4 is a block diagram showing the configuration of software employed in the information processing system in FIG. 1.

Referring to FIG. 4, the host apparatus 51 is comprised of three kinds of software consisting of hierarchical application software, operating system (OS), and driver software (the driver software 54), and these three software cooperate with each other to perform image processing so as to output image data to the image output apparatus 52.

The application software is comprised of application software 11. The OS (operation system) is comprised of a drawing interface 21 that provides interface for receiving a drawing instruction from the application software 11, and a spooler 22 that outputs the generated image data to the image output apparatus 52 such as an ink-jet printer.

The driver software is comprised of apparatus 52 specific drawing functions 31-1 31-2, . . . , 31-n storing expressive forms specific to the image output apparatus 52, a color characteristic converting module 33 that receives line-separated image information from the OS and converts an internal color system of the driver software into a color system specific to the image output apparatus 52, a halftoning module 34 that converts the image information into quantized quantities representing the status of respective pixels of the image output apparatus 52, and a print command generating module 35 that outputs the half-toned image information with a command for the image output apparatus 52 added thereto to the spooler 22.

According to the present embodiment, the apparatus-specific drawing functions 31-1, 31-2, . . . , 31-n perform image processing dependent on the respective image output apparatuses 52, so that the processing dependent on the respective image output apparatuses 52 is separated from a program that enables processing common to the image output apparatuses 52, and basic processing parts of the driver software are constructed independently of each image output apparatus 52.

Line-separated image information is subjected to image processing by the color characteristic converting module 33, the halftoning module 34, and the like, then subjected to data compression and command addition by the print command generating module 35, and outputted to the image output apparatus 52 via the spooler 22 provided in the OS.

A description will now be given of the outline of image processing performed in the information processing system in FIG. 1.

Figure 5:
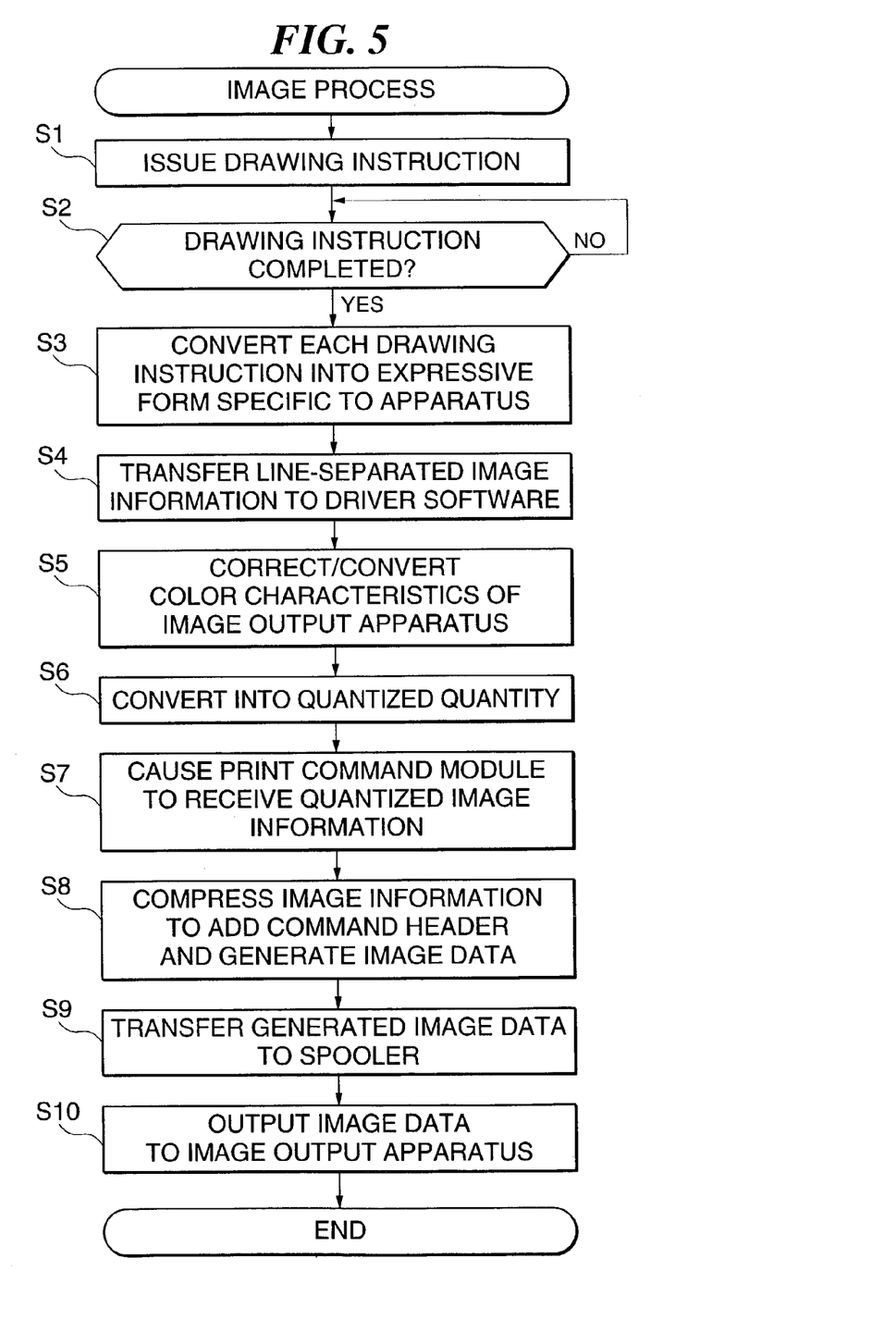
FIG. 5 is a flow chart showing image processing performed in the information processing system in FIG. 1.

FIG. 5 is a flow chart showing image processing performed in the information processing system in FIG. 1.

To output an image data to the image output apparatus 52 by the application software 11, as shown in FIG. 5, the application software 11 first issues an instruction for drawing characters, lines, figures, and/or bitmaps, etc. composing a screen/sheet surface to the apparatus-specific drawing functions 31-1, 31-2, . . . , 31-n inside the driver software via the drawing interface 21 of the OS (step S1).

It is then determined whether the drawing composing a screen/sheet surface has been completely issued or not (step S2). If it is determined that the drawing instruction has been completely issued ("YES" in the step S2), the OS calls the corresponding one of the apparatus-specific drawing functions 31-1, 31-2, . . . , 31-n inside the driver software, while converting each c drawing instruction from an internal format in the OS into an expressive form (in which each drawing unit is line-separated) specific to the image output apparatus 52 (step S3). Image information obtained by line-separating the screen/sheet is then transferred to the driver software (step S4).

In the driver software, the color characteristic converting module 33 corrects the color characteristics of the image output apparatus 52 and performs conversion from the internal color system of the driver software into a color system specific to the image output apparatus 52 (step S5). The halftoning module 34 converts the line-separated image information into quantized quantities representing the conditions of respective pixels in the image output apparatus 52 (half-toning) (step S6). It should be noted that the conversion into quantized quantities is carried out according to the form of data to be processed by the image output apparatus 52. For example, if the image output apparatus 52 performs recording processing based on binary data, image information is binarized, and if the image output apparatus 52 performs recording processing based on multivalued data (for recording using dark and light inks, large and small droplet inks, or the like), image information is converted into multivalued data.

The print command generating module 35 receives image data quantized (binarized or multivalued) from the halftoning module 34 (step S7). The print command generating module 35 performs processing on the quantized image data in different ways according to the characteristics of the image output apparatus 52, and compresses the image information to add a command header thereto, thus generating image data (step S8).

The print command generating module 35 then transfers the generated image data to the spooler 22 provided in the OS (step S9), and the spooler 22 outputs the image data to the image output apparatus 52 (step S10), followed by terminating the present process.

It should be noted that in the present embodiment, a program according to the flow chart of FIG. 5 is stored in the HDD 2002 or the like in the host apparatus 51 so that the above described control can be realized by the MPU 1001 executing the program read out from the HDD 2002 or the like.

Further, since the basic processing parts of the driver software are constructed independently of each image output apparatus 52 as described above, it is possible to flexibly change the allotment of data processing to the driver software and the image output apparatus 52 without damaging the configuration of the driver software. This is advantageous in terms of software maintenance and management.

A detailed description will now be given of error diffusion performed by the halftoning module 34 according to the present embodiment. The error diffusion according to the present embodiment assumes that image data of a color image is used as multivalued image data as density data whose pixels are each composed of a yellow (Y) component, magenta (M) component, cyan (C) component, and black (K) component, which are each composed of 8 bits (expressed in 256 gradation values).

A description will now be given of an image processing method according to the first embodiment, which reduces the overlap of dark ink dots and light ink dots of the same color system by providing complicated threshold control with ease using threshold tables. The threshold tables are data of thresholds required for determining gradations of image data. It should be noted that image data of a color image is expressed as multivalued image data whose pixels are each composed of coloring density components (YMCK), which are each composed of 8 bits (gradation values from 0 to 255).

Where the density values of dark ink and light ink of a cyan (C) component of an arbitrary notice pixel in image data of a color image are designated by Ct and ct, respectively, and the density values of dark ink and light ink of a C component of the original image are designated by C and c, respectively, the density values Ct and ct are expressed by:

$$Ct=C+Cerr$$

$$ct=cerr$$

Here, Cerr and cerr represent accumulated error values obtained by error diffusion of dark ink and light ink, respectively, of the notice pixel.

Figure 6:
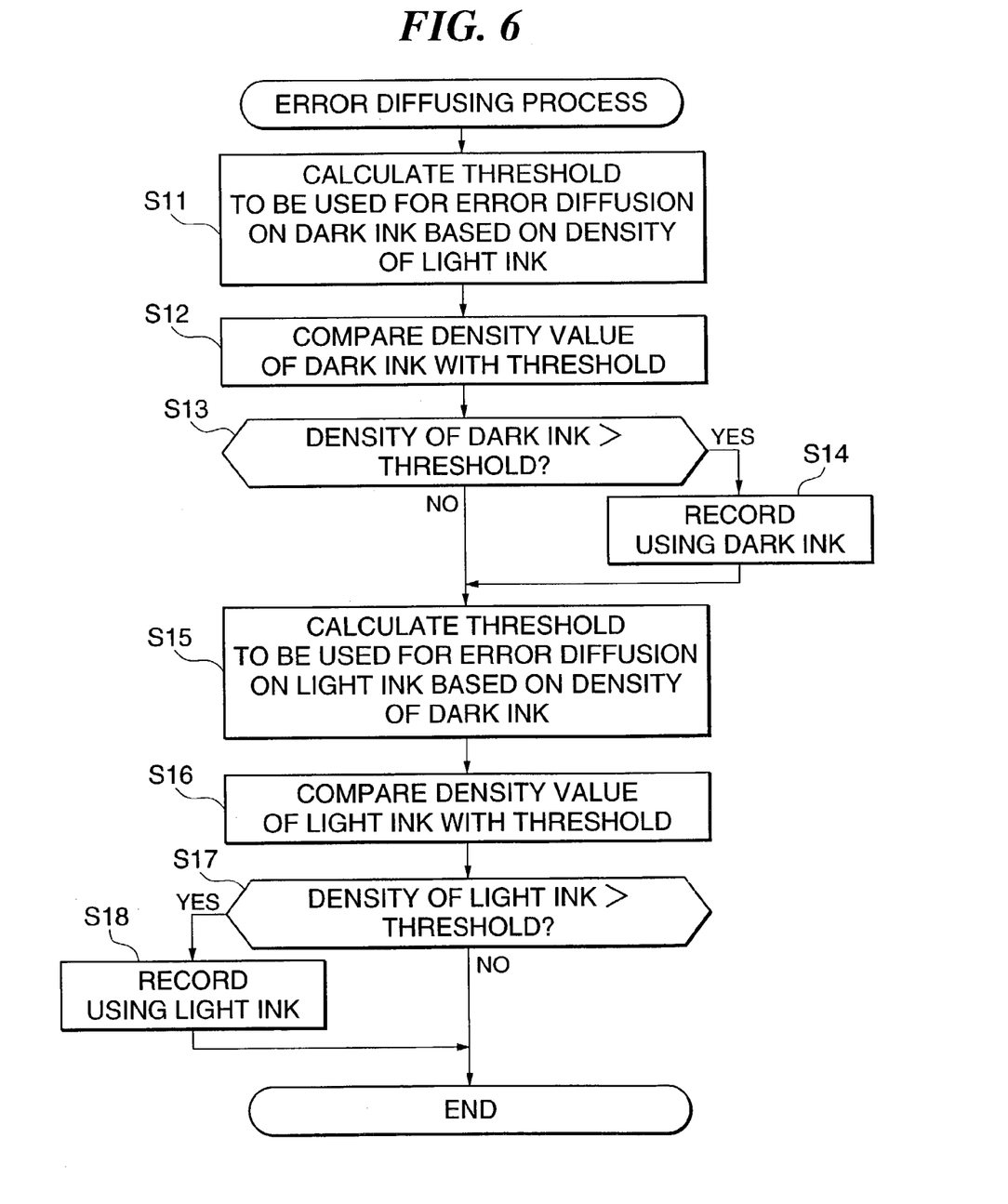
FIG. 6 is a flow chart showing an error diffusing process carried out in the information processing system in FIG. 1.

According to the first embodiment, image processing is performed on a color image by carrying out an error diffusing process using the above described density values according to an error diffusing process shown in FIG. 6. The error diffusing process is carried out in accordance with a program, which is read out from the HDD 2002 by the MPU 1001 in the host apparatus 51.

1. A threshold (c threshold) to be used for error diffusion on dark ink is obtained based on the density value ct of light ink (step S11).

2. The density value Ct of dark ink and the threshold (c threshold) are compared with each other, and if the density value Ct is greater than the threshold (c threshold), recording is performed using dark ink (steps S12 to S14).

3. A threshold (C threshold) to be used for error diffusion on light ink is obtained based on the density value Ct of dark ink (step S15).

4. The density value ct of light ink and the threshold (C threshold) are compared with each other, and if the density value ct is greater than the threshold (C threshold), recording is performed using light ink (steps S16 to S18).

An algorithm based on the above described processing is represented by the following expressions. This algorithm can reduce the overlap of dark ink dots and light ink dots of the same color system.

```
Ct=C+Cerr
ct=c+cerr
if(Ct>Threshold_Table[ct])
    Print C
if(ct>Threshold_Table[Ct])
    Print c
```

(Threshold_Table[ct]: a threshold table to be used for error diffusion on dark ink, Threshold_Table[Ct]: a threshold table to be used for error diffusion on light ink)

According to the above described present embodiment, in the case where error diffusion as pseudo-halftoning is performed on image data of a color image, a threshold (c threshold) to be used for error diffusion on dark ink is obtained, and the density value Ct of dark ink and the threshold (c threshold) are compared with each other, thus enabling reduction of the overlap of ink dots of the same color system with different coloring densities.

A description will now be given of an image processing method according to a second embodiment of the present invention, which reduces the overlap of large droplet ink and small droplet ink of the same color system. Incidentally, as is the case with the above described first embodiment, in the present embodiment, image data of a color image is expressed as multivalued image data whose each pixel are composed of coloring density components (YMCK) each comprised of 8 bits (gradation values from 0 to 255).

Where the density values of large droplet ink and small droplet ink of a cyan (C) component of an arbitrary notice pixel in image data of a color image are designated by Clt and Cst, respectively, and the density values of large droplet ink and small droplet ink of a C component of the original image are designated by Cl and Cs, respectively, the density values Clt and Cst are expressed by:

$$Clt=Cl+Clerr$$

$$Cst=Cs+Cserr$$

Here, Clerr and Cserr represent accumulated error values obtained by error diffusion of large droplet ink and small droplet ink, respectively, of the notice pixel.

According to the second embodiment, image processing is performed on a color image by carrying out an error diffusing process using the above described density values. As is the case with the first embodiment, the error diffusing process is carried out in accordance with a program, which is read out from the HDD 2002 by the MPU 1001 in the host apparatus 51.

1. A threshold (Cs threshold) to be used for error diffusion on large droplet ink is obtained based on the density value Cst of small droplet ink.

2. The density value Cl of large droplet ink and the threshold (Cs threshold) are compared with each other, and if the density value Clt is greater than the threshold (Cs threshold), recording is performed using large droplet ink.

3. A threshold (Cl threshold) to be used for error diffusion on small droplet ink is obtained based on the density value Clt of large droplet ink.

4. The density value Cs of small droplet ink and the threshold (Cl threshold) are compared with each other, and if the density value Cst is greater than the threshold (Cl threshold), recording is performed using small droplet ink.

An algorithm based on the above described processing is represented by the following expressions. This algorithm can reduce the overlap of large droplet ink dots and small droplet ink dots of the same color system.

```
Clt=Cl+Clerr
Cst=Cs+Cserr
if(Clt>Threshold_Table[Cst])
    Print Cl
if(Cst>Threshold_Table[Clt])
    Print Cs
```

(Threshold_Table[Cst]: a threshold table to be used for error diffusion on large droplet ink, Threshold_Table[Clt]: a threshold table to be used for error diffusion on small droplet ink)

According to the above described second embodiment, in the case where error diffusion as pseudo-halftoning is performed on image data of a color image, a threshold (Cs threshold) to be used for error diffusion on large droplet ink is obtained, and the density value Ct of large droplet ink and the threshold (Cs threshold) are compared with each other, thus enabling reduction of the overlap of ink dots of the same color system with different discharge rates.

A description will now be given of an image processing method according to a third embodiment of the present invention, which can reduce the overlap of ink groups of a plurality of colors with different coloring densities. Incidentally, as is the case with the above described first embodiment, image data of a color image is expressed as multivalued image data whose each pixel are composed of coloring density components (YMCK) each composed of 8 bits (graduation values from 0 to 255).

Where the density values of dark ink and light ink of a cyan (C) component of an arbitrary notice pixel in image data of a color image are designated by Ct and ct, respectively, the density values of dark ink and light ink of a magenta (M) component of the notice pixel are designated by Mt and mt, respectively, the density values of dark ink and light ink of a C component of the original image are designated by C and c, respectively, the density values of dark ink and light ink of a M component of the original image are designated by M and m, respectively, the density values Ct, ct, Mt, and, mt are expressed by:

$$Ct = C + Cerr$$

$$ct = cerr$$

$$Mt = M + Merr$$

$$mt = m + merr$$

Here, Cerr and cerr and Merr and merr represent accumulated error values obtained by error diffusion of dark ink and light ink of the C component and the M component, respectively, of the notice pixel.

According to the third embodiment, image processing is performed on a color image by carrying out an error diffusing process using the above described density values. As is the case with the first embodiment, the error diffusing process is carried out in accordance with a program, which is read out from the HDD 2002 by the MPU 1001 in the host apparatus 51.

1. A threshold to be used for error diffusion on dark ink of the C component is obtained based on the sum of the density value ct of light ink of the C component, the density value Mt of dark ink of the M component, and the density value mt of light ink of the M component.

2. The density value Ct of dark ink of the C component and the above threshold are compared with each other, and if the density value Ct is greater than the threshold, recording is performed using dark ink of the C component.

3. A threshold to be used for error diffusion on light ink of the C component is obtained based on the sum of the density value Ct of dark ink of the C component, the density value Mt of dark ink of the M component, and the density value mt of light ink of the M component.

4. The density value ct of light ink of the C component and the above threshold are compared with each other, and if the density value ct is greater than the threshold, recording is performed using light ink of the C component.

5. A threshold to be used for error diffusion on dark ink of the M component is obtained based on the sum of the density value mt of light ink of the M component, the density value Ct of dark ink of the C component, and the density value ct of light ink of the C component.

6. The density value Mt of dark ink of the M component and the above threshold are compared with each other, and if the density value Mt is greater than the threshold, recording is performed using dark ink of the M component.

7. A threshold to be used for error diffusion on light ink of the M component is obtained based on the sum of the density value Mt of dark ink of the M component, the density value Ct of dark ink of the C component, and the density value Ct of light ink of the C component.

8. The density value mt of light ink of the M component and the above threshold are compared with each other, and if the density value mt is greater than the threshold, recording is performed using light ink of the M component.

An algorithm based on the above described processing is represented by the following expressions. This algorithm can reduce the overlap of dark ink dots and light ink dots of the cyan component, and the overlap of dark ink dots and light ink dots of the magenta component.

```
Ct=C+Cerr
ct=c+cerr
Mt=M+Merr
mt=m+merr
if(Ct>Threshold_Table[ct+Mt+mt])
    Print C
if(ct>Threshold_Table[Ct+Mt+mt])
    Print c
if (Mt>Threshold_Table[Ct+ct+mt])
    Print M
if(mt>Threshold_Table[Ct+ct+Mt])
    Print m
```

According to the above described third embodiment, it is possible to reduce the overlap of ink groups of a plurality of colors with different coloring densities.

A description will now be given of an image processing method according to a forth embodiment of the present invention, which can reduce the overlap of dots of ink groups of a plurality of colors with different discharge rates. Incidentally, as is the case with the first embodiment, image data of a color image is expressed as multivalued image data whose each pixel are composed of coloring density components (YMCK) each composed of 8 bits (gradation values 0 to 255)

Where the density values of large droplet ink and small droplet ink of a cyan (C) component of an arbitrary notice pixel in image data of a color image are designated by Clt and Cst, respectively, the density values of large droplet ink and small droplet ink of a magenta (M) component of the notice pixel are designated by Mlt and Mst, respectively, the density values of large droplet ink and small droplet ink of a C component of the original image are designated by Cl and Cs, respectively, the density values of large droplet ink and small droplet ink of a M component of the original image are designated by Ml and Ms, respectively, the density values Clt, Cst, Mlt, and Mst are expressed by:

$$Clt=Cl+Clerr$$

$$Cst=Cs+Cserr$$

$$Mlt=Ml+Mlerr$$

$$Mst=Ms+Mserr$$

Here, Clerr and Cserr and Mlerr and Mserr represent accumulated error values obtained by error diffusion of large droplet ink and small droplet ink of the C component and the M component, respectively, of the notice pixel.

According to the fourth embodiment, image processing is performed on a color image by carrying out an error diffusing process using the above described density values. As is the case with the first embodiment, the error diffusing process is carried out in accordance with a program that is read out from the HDD 2002 by the MPU 1001 in the host apparatus 51.

1. A threshold to be used for error diffusion on large droplet ink of the C component is obtained based on the sum of the density value Cst of small droplet ink of the C component, the density value Mlt of large droplet ink of the M component, and the density value Mst of small droplet ink of the M component.

2. The density value Clt of large droplet ink of the C component and the above threshold are compared with each other, and if the density value Clt is greater than the threshold, recording is performed using large droplet ink of the C component.

3. A threshold to be used for error diffusion on small droplet ink of the C component is obtained based on the sum of the density value Clt of large droplet ink of the C component, the density value Mlt of large droplet ink of the M component, and the density value Mst of small droplet ink of the M component.

4. The density value Cst of small droplet ink of the C component and the above threshold are compared with each other, and if the density value Cst is greater than the threshold, recording is performed using small droplet ink of the C component.

5. A threshold to be used for error diffusion on large droplet ink of the M component is obtained based on the sum of the density value Mst of small droplet ink of the M component, the density value Clt of large droplet ink of the C component, and the density value Cst of small droplet ink of the C component.

6. The density value Mlt of large droplet ink of the M component and the above threshold are compared with each other, and if the density value Mlt is greater than the threshold, recording is performed using large droplet ink of the M component.

7. A threshold to be used for error diffusion on small droplet ink of the M component is obtained based on the sum of the density value Mlt of large droplet ink of the M component, the density value Clt of large droplet ink of the C component, and the density value Cst of small droplet ink of the C component.

8. The density value Mst of small droplet ink of the M component and the above threshold are compared with each other, and if the density value Mst is greater than the threshold, recording is performed using small droplet ink of the M component.

An algorithm based on the above described processing is represented by the following expressions. This algorithm can reduce the overlap of large droplet ink dots and small droplet ink dots of the cyan component, and the overlap of large droplet ink dots and small droplet ink dots of the magenta component.

```
Clt=Cl+Clerr
Cst=Cs+Cserr
Mlt=Ml+Mlerr
Mst=Ms+Mserr
if(Clt>Threshold_Table[Cst+Mlt+Mst])
    Print Cl
if(Cst>Threshold_Table[Clt+Mlt+Mst])
    Print Cs
if (Mlt>Threshold_Table[Clt+Cst+Mst])
    Print Ml
if(Mst>Threshold_Table[Clt+Cst+Mlt])
    Print Ms
```

According to the above described fourth embodiment, it is possible to reduce the overlap of ink groups of a plurality of colors with different discharge rates.

A description will now be given of an image processing method according to a fifth embodiment of the present invention, which can reduce the overlap of dots of ink groups of a plurality of colors with different coloring densities and different discharge rates. Incidentally, as is the case with the first embodiment, image data of a color image is expressed as multivalued image data whose each pixel are composed of coloring density components (YMCK) each comprised of 8 bits (gradation values from 0 to 255).

As is the case with the above described first to fourth embodiments, where the density values of large droplet dark ink, small droplet dark ink, large droplet light ink, and small droplet light ink of a C component of the original image are designated by Cl, Cs, cl, and cs, respectively, the density values of large droplet dark ink, small droplet dark ink, large droplet light ink, and small droplet light ink of a M component of the original image are designated by Ml, Ms, ml, and ms, respectively, the density value Clt of large droplet dark ink, small droplet dark ink, large droplet light ink, and small droplet light ink of a C component of an arbitrary notice pixel in image data of a color image are designated by Clt, Cst, clt, and cst, respectively, and the density values of large droplet dark ink, small droplet dark ink, large droplet light ink, and small droplet light ink of a M component of the notice pixel are designated by Mlt, Mst, mlt, and mst, respectively, the density values Clt, Cst, clt, cst, Mlt, Mst, mlt, and mst are expressed by:

$$Clt=Cl+Clerr$$

$$Cst=Cs+Cserr$$

$$clt=cl+clerr$$

$$cst=cs+cserr$$

$$Mlt=Ml+Mlerr$$

$Mst = Ms + Mserr$ $mlt = ml + mlerr$ $mst = ms + mserr$

According to the fifth embodiment, image processing is performed on a color image using the above-mentioned density values according to an algorithm represented by the following expressions. As is the case with the first embodiment, the error diffusing process is carried out in accordance with a program, which is read out from the HDD 2002 by the MPU 1001 in the host apparatus 51.

```
if(Clt>Threshold_Table[Cst+clt+cst+Mlt+Mst+mlt+mst])
    Print Cl: recording is performed using large
droplet dark ink of the cyan component
    if(Cst>Threshold_Table[Clt+clt+cst+Mlt+Mst+mlt+mst])
        Print Cs: recording is performed using small
droplet dark ink of the cyan component
    if(clt>Threshold_Table[Clt+Cst+cst+Mlt+Mst+mlt+mst])
        Print cl: recording is performed using large
droplet light ink of the cyan component
    if(cst>Threshold_Table[Clt+Cst+clt+Mlt+Mst+mlt+mst])
        Print cs: recording is performed using small
droplet light ink of the cyan component
    if(Mlt>Threshold_Table[Clt+Cst+clt+cst+Mst+mlt+mst])
        Print Ml: recording is performed using large
droplet dark ink of the magenta component
    if(Mst>Threshold_Table[Clt++Cst+clt+cst+Mlt+mlt
+mst])
        Print Ms: recording is performed using small
droplet dark ink of the magenta component
    if(mlt>Threshold_Table[Clt+Cst+clt+cst+Mlt+Mst+mst])
        Print ml: recording is performed using large
droplet light ink of the magenta component
    if(mst>Threshold_Table[Clt+Cst+clt+cst+Mlt+Mst+mlt])
        Print ms: recording is performed using small
droplet light ink of the magenta component
```

According to the above described fifth embodiment, it is possible to reduce the overlap of respective dots of ink groups of a plurality of colors with different coloring densities and different discharge rates.

Although in the above described third to fifth embodiments, processing is performed using a threshold that is obtained based on the sum of density values of at least two density components among a plurality of density components, the present invention is not limited to this, but processing may be performed using a threshold that is obtained based on the maximum value of density values of at least two density components among a plurality of density components. Further, processing may be performed using a threshold that is obtained based on the above described sum and maximum value of density values.

Although in the above described first to fifth embodiments, it is assumed that two ink colors of cyan and magenta, two quantization gradations of 0 and 1, two coloring densities of a high density and a low density, and two discharge rates of a high rate and a low rate are used, the present invention is not limited to this, but the present invention may be applied to a larger number of ink colors, a larger number of quantization gradations, coloring density gradations, and discharge rate gradations.

It is to be understood that the present invention is not limited to the above described methods, but any method can be adopted insofar as the effects of the present invention can be obtained. For example, the present invention may be applied to a method disclosed in Japanese Laid-Open Patent Publication (Kokai) No. 08-279920 and Japanese Laid-Open Patent Publication (Kokai) No. 11-10918 or to a method disclosed in Japanese Laid-Open Patent Publication (Kokai) No. 09-139841.

Further, although in the above described embodiments, droplets discharged from the recording head IJH are ink droplets and liquids stored in the ink tank IT are inks, what is stored in the ink tank IT is not limited to inks. For example, processing liquids or the like, which are discharged to a recording medium so as to improve fixability and water resistance of a recorded image or to improve the image quality, may be stored in the ink tank.

Further, the image output apparatus 52 is provided with a means for generating thermal energy for use in discharge of inks (such as an electric thermal converter and laser beams), particularly among a variety of ink-jet recording methods. High recording density and recording accuracy can be achieved by this method which changes the condition of inks by the thermal energy.

It is preferred that the typical arrangement and principle of the method are based upon a basic principle disclosed in U.S. Pat. Nos. 4,723,129 and 4,740,796. This method may be applied either to an on-demand printing process or to a continuous printing process, but is particularly effective if applied to the on-demand printing process because the application of at least one driving signal, which corresponds to recording information and causes such a rapid temperature increase as to exceed a nucleate boiling point, to an electric heat converter arranged correspondingly to a sheet and a liquid path holding a liquid (ink) to cause the electric heat converter to generate thermal energy and cause film boiling on a heat operating surface of a recording head, thus forming bubbles in a liquid (ink) in one-to-one correspondence with the driving signal. The growth and contraction of the bubbles cause the liquid (ink) to be discharged through a discharge port to form at least one droplet. More preferably, a pulse-shaped signal is used as the driving signal because it enables immediate and proper growth and contraction of the bubbles to discharge a liquid (ink) with high responsiveness.

Preferred examples of the pulse-shaped driving signal in pulse form are disclosed in U.S. Pat. Nos. 4,463,359 and 4,345,262. It should be noted that more excellent recording can be realized by adopting the conditions disclosed in U.S. Pat. No. 4,313,124 related to the temperature increase rate of the thermal operating surface.

The construction of the recording head according to the present invention encompasses those disclosed in U.S. Pat. Nos. 4,558,333 and 4,459,600 in which a recording head is arranged in a region where the heat operating surface is bent, in addition to the construction of the discharge port, liquid paths, and electric heat converters (linear liquid paths or right-angle liquid paths) as disclosed in the above-mentioned U.S. patent publications. In addition, the recording head may be constructed as disclosed in Japanese Laid-Open Patent Publication (Kokai) No. 59-123670, which discloses that a slot common to a plurality of electric heat converters is used as a discharge port of the electric heat converters, or Japanese Laid-Open Patent Publication (Kokai) No. 59-138461 which discloses that an opening for absorbing pressure waves of thermal energy is formed correspondingly to a discharge port.

Further, a full-line type recording head with a length corresponding to the maximum recording medium width with which data can be recorded by an image output apparatus may be constructed such that the required length is satisfied by a combination of a plurality of recording heads as disclosed in the above-mentioned publications or may be constructed as a recording head configured as an integral unit.

In addition, not only a cartridge type recording head formed integrally with an ink tank but also a replaceable chip type recording head capable of being electrically connected to the main body of a output apparatus and being supplied with inks from the main body of the output apparatus may be used as the recording head of the above described embodiments.

It is preferred that a restoration means, a preliminary means and so forth for the recording head, are added to the image output apparatus constructed as described above so as to further stabilize the recording operation. Examples of the restoration means, the preliminary means, and so forth for the recording head to be added include a capping means, a cleaning head, a pressurizing or absorbing means, and a preliminary heating means comprised of an electric heat converter or another heating element or a combination thereof. To provide a preliminary discharge mode for performing discharge other than the discharge intended for recording is effective for stable recording.

Further, the image output apparatus may be provided with not only a recording mode in which recording is performed in a main color such as black but also at least either one of a multiple color mode in which recording is performed in a plurality of different colors and a full color mode in which recording is performed in mixed colors irrespective of whether the recording head is configured as an integral unit or is provided in plurality.

Further, although in the above described embodiments, it is assumed that the inks are liquids, it is possible to use inks which solidify at a temperature equal to or lower than room temperature or inks which soften or liquefy at room temperature. Alternatively, in the case of ink-jet recording, since the temperature is controlled by regulating the temperature so as to be within a range between 30° C. and 70° C. such that the viscosity of inks lies in a stable discharge range, any inks can be used insofar as they are in liquid phase when a usage recording signal is applied.

In addition, to positively prevent a temperature increase due to thermal energy by using the thermal energy for transition of inks from a solid state to a liquid state, or to prevent evaporation of inks, it is possible to use inks which solidify when left as they are and liquefy when heated. Anyway, the present invention may be applied to the case where inks, which are liquefied only by applying thermal energy thereto, such as inks, which are liquefied by thermal energy applied in response to a recording signal and discharged as liquids, and inks, which have already started solidifying when reaching a recording medium, are used. In this case, inks may be opposed to electric heat converters while being held as liquids or solid matters in concaves or through holes in a porous sheet as disclosed in Japanese Laid-Open Patent Publication (Kokai) No. 54-56847 or Japanese Laid-Open Patent Publication (Kokai) No. 60-71260. According to the present invention, performing the above-mentioned film boiling is the most effective for the above-mentioned color inks.

Further, the image output apparatus according to the present invention may be configured as an integral unit or a separate unit as an image output terminal of information processing equipment such as a computer, or may be implemented by a copying machine used in combination with a reader or the like or a facsimile apparatus having a transmitting and receiving function.

The present invention may either be applied to a system composed of a plurality of apparatuses (e.g. a host computer, interface equipment, a reader, and a printer) or to a single apparatus (e.g. a copying machine, a facsimile machine, or the like).

It is to be understood that the object of the present invention may also be accomplished by supplying a system or an apparatus with a storage medium in which a program code of software which realizes the functions of any of the above described embodiments is stored, and causing a computer (or CPU or MPU) of the system or apparatus to read out and execute the program code stored in the storage medium. In this case, the program code itself read from the storage medium realizes the functions of any of the embodiments described above, and hence the storage medium on which the program code is stored constitutes the present invention.

Further, it is to be understood that the functions of any of the above described embodiments may be accomplished not only by executing a program code read out by a computer, but also by causing an OS (Operating System) or the like which operates on the computer to perform a part or all of the actual operations based on instructions of the program code.

Further, it is to be understood that the functions of any of the above described embodiments may be accomplished by writing a program code read out from the storage medium into an expansion board inserted into a computer or a memory provided in an expansion unit connected to the computer and then causing a CPU or the like provided in the expansion board or the expansion unit to perform a part or all of the actual operations based on instructions of the program code.

What is claimed is:

1. An image processing apparatus that performs error diffusion on multivalued image data composed of a plurality of density components comprising:

a determination device, operable when performing the error diffusion on a first density component of the plurality of density components, for determining a threshold to be used for the error diffusion based on a density value of a second density component of the plurality of density components;

an executing device that executes the error diffusion on the first density component based on the determined threshold; and an output device that outputs a result of the executed error diffusion;

wherein the first density component and the second density component are different from each other in at least one of coloring density and discharge rate.

2. An image processing apparatus that performs error diffusion on multivalued image data composed of a plurality of density components, comprising:

a determination device operable when performing the error diffusion on a first density component of the plurality of density components, for determining a threshold to be used for the error diffusion based on density values of at least two second density components of the plurality of density components;

an executing device that executes the error diffusion on the first density component based on the determined threshold; and an output device that outputs a result of the executed error diffusion.

3. An image processing apparatus according to claim 2, wherein the first density component and the second density components are different from each other in at least one of color, coloring density, and discharge rate.

4. An image processing apparatus that performs error diffusion on multivalued image data composed of a plurality of density components, comprising:
   a determination device operable when performing the error diffusion on a first density component of the plurality of density components, for determining a threshold to be used for the error diffusion based on at least one of a sum of and a maximum value of density values of at least two second density components of the plurality of density components;
   an executing device that executes the error diffusion on the first density component based on the determined threshold; and
   an output device that outputs a result of the executed error diffusion;
   wherein the first density component and the second density component are different from each other in at least one of coloring density and discharge rate.

5. An image processing method of performing error diffusion on multivalued image data composed of a plurality of density components, comprising:
   a determination step of determining a threshold to be used for the error diffusion based on a density value of at least one second density component of the plurality of density components when performing the error diffusion on a first density component of the plurality of density components;
   an executing step of executing the error diffusion on the first density component based on the determined threshold; and
   an output step of outputting a result of the executed error diffusion.

6. An image processing method according to claim 5, wherein the first density component and the second density component are different from each other in at least one of color, coloring density, and discharge rate.

7. An image processing method of performing error diffusion on multivalued image data composed of a plurality of density components, comprising:
   a determination step of determining a threshold to be used for the error diffusion based on density values of at least two second density components of the plurality of density components when performing the error diffusion on a first density component of the plurality of density components;
   an executing step of executing the error diffusion on the first density component based on the determined threshold; and
   an output step of outputting a result of the executed error diffusion;
   wherein the first density component and the second density component are different from each other in at least one of coloring density and discharge rate.

8. An image processing method of performing error diffusion on multivalued image data composed of a plurality of density components, comprising:
   a determination step of determining a threshold to be used for the error diffusion based on at least one of a sum of and a maximum value of density values of at least two second density components of the plurality of density components when performing the error diffusion on a first density component of the plurality of density components;
   an executing step of executing the error diffusion on the first density component based on the determined threshold; and
   an output device of outputting a result of the executed error diffusion;
   wherein the first density component and the second density component are different from each other in at least one of coloring density and discharge rate.

9. A computer-readable medium storing a program for causing a computer to execute an image processing method of performing error diffusion on multivalued image data composed of a plurality of density components, the program comprising:
   a determination module operable when performing the error diffusion on a first density component of the plurality of density components, for determining a threshold to be used for the error diffusion based on density values of at least two second density components of the plurality of density components;
   an executing module for executing the error diffusion on the first density component based on the determined threshold; and
   an output module for outputting a result of the executed error diffusion;
   wherein the first density component and the second density component are different from each other in at least one of coloring density and discharge rate.

10. A computer-readable medium storing a program for causing a computer to execute an image processing method of performing error diffusion on multivalued image data composed of a plurality of density components, the program comprising:
    a determination module operable when performing the error diffusion on a first density component of the plurality of density components, for determining a threshold to be used for the error diffusion based on at least one of a sum of and a maximum value of density values of at least two second density components of the plurality of density components;
    an executing module for executing the error diffusion on the first density component based on the determined threshold; and
    an output module for outputting a result of the executed error diffusion;
    wherein the first density component and the second density component are different from each other in at least one of coloring density and discharge rate.

11. An image processing apparatus that performs error diffusion on multivalued image data composed of a plurality of pixels, wherein each pixel includes a plurality of color components respectively corresponding to different color systems, wherein at least one color component includes at least a first density component and a second density component within the same color system, said apparatus comprising:
    a determination device for determining a threshold to be used for the error diffusion based on at least a density value of the second density component of a first color component;
    an executing device that executes the error diffusion on the first density component of the first color component based on the determined threshold; and
    an output device that outputs a result of the executed error diffusion.

12. An image processing apparatus as claimed in claim 11, wherein the first density component and the second density component have a different color density within a first color system corresponding to the first coloring density component.

13. An image processing apparatus according to claim 12, wherein the first density component and the second density component respectively correspond to a dark ink and a light ink of the first color system.

14. An image processing apparatus according to claim 12, wherein the first density component and the second density component respectively correspond to a light ink and a dark ink of the first color system.

15. An image processing apparatus as claimed in claim 11, wherein the first density component and the second density component have a different discharge rate density.

16. An image processing apparatus according to claim 15, wherein the first density component and the second density component respectively correspond to a large ink drop and a small ink drop of the first color system.

17. An image processing apparatus according to claim 15, wherein the first density component and the second density component respectively correspond to a small ink drop and a large ink drop of the first color system.

18. An image processing apparatus according to claim 11, wherein the determination device further determines the threshold based on a density value of the second density component and the first density component of a second color component that corresponds to a second color system that is different from a first color system that corresponds to the first color component.

19. An image processing apparatus as claimed in claim 18, wherein the first density component and the second density component of the first color component have a different color density within the first color system, and wherein the first density component and the second density component of the second color component have a different color density within the second color system.

20. An image processing apparatus according to claim 19, wherein the first density component and the second density component of the first color component respectively correspond to a dark ink and a light ink of the first color system, and wherein the first density component and the second density component of the second color component respectively correspond to a dark ink and a light ink of the second color system.

21. An image processing apparatus according to claim 19, wherein the first density component and the second density component of the first color component respectively correspond to a light ink and a dark ink of the first color system, and wherein the first density component and the second density component of the second color component respectively correspond to a light ink and a dark ink of the second color system.

22. An image processing apparatus as claimed in claim 18, wherein the first density component and the second density component of the first color component have a different discharge rate density, and wherein the first density component and the second density component of the second color component have a different discharge rate density.

23. An image processing apparatus according to claim 22, wherein the first density component and the second density component of the first color component respectively correspond to a large ink drop and a small ink drop of the first color system, and the first density component and the second density component of the second color component respectively correspond to a large ink drop and a small ink drop of the second color system.

24. An image processing apparatus according to claim 22, wherein the first density component and the second density component of the first color component respectively correspond to a large ink drop and a small ink drop of the first color system, and the first density component and the second density component of the second color component respectively correspond to a large ink drop and a small ink drop of the second color system.

* * * * *